United States Patent [19]
Drees

[11] Patent Number: 5,769,315
[45] Date of Patent: Jun. 23, 1998

[54] PRESSURE DEPENDENT VARIABLE AIR VOLUME CONTROL STRATEGY

[75] Inventor: Kirk H. Drees, Cedarburg, Wis.

[73] Assignee: Johnson Service Co., Milwaukee, Wis.

[21] Appl. No.: 889,201

[22] Filed: Jul. 8, 1997

[51] Int. Cl.$^6$ .............................. G05D 15/00; F24F 7/00
[52] U.S. Cl. ..................... 236/49.3; 165/217; 236/28 D; 454/255
[58] Field of Search .................... 236/49.3, 78; 165/217, 165/216; 454/255

[56] References Cited

U.S. PATENT DOCUMENTS

| | | | |
|---|---|---|---|
| 5,344,069 | 9/1994 | Narikiyo | 165/217 |
| 5,400,963 | 3/1995 | Ishikawa | 236/49.3 |
| 5,558,274 | 9/1996 | Ben-Aissa et al. | 236/49.3 |

Primary Examiner—William E. Wayner
Attorney, Agent, or Firm—Quarles & Brady

[57] ABSTRACT

A control strategy for rejecting supply air temperature disturbances in variable air volume air conditioning units using staged DX cooling. The strategy, and corresponding system, minimizes supply air temperature disturbances by controlling zone air dampers through a mapping of zone heat transfer requirements and damper positions. The mapping maintains a zone temperature setpoint, even with relatively large temperature swings caused by system-supplied conditioned air. The primary parameter that is controlled by the strategy of the present invention is a heat transfer rate associated with a temperature-controlled zone. The control strategy of the present invention estimates the zone heat transfer rate at a particular sampling instant and controls the damper position in response thereto.

15 Claims, 6 Drawing Sheets

PRESSURE DEPENDENT VARIABLE AIR VOLUME CONTROL STRATEGY

TECHNICAL BACKGROUND

The present invention relates generally to HVAC controls, and more particularly to a method and system for minimizing supply air temperature disturbances in multi-zone variable air volume systems using staged DX cooling.

BACKGROUND OF THE INVENTION

Variable air volume (VAV) air conditioning systems are commonly used in small to medium commercial applications. In a prototypical multi-zone VAV system, outside air is mixed with return air before being subjected to system cooling or heating elements. After being conditioned by system cooling or heating elements, the air is supplied into one of the zones regulated by the system through a VAV box. The VAV box, which includes a thermostat and an adjustable air damper controlled by a VAV box controller, regulates the flow of air into the zone so that a zone temperature can be maintained at or near a zone temperature setpoint.

In conventional VAV air conditioning systems, a direction expansion (DX) coil is used to remove heat and moisture from the mixture of return air and outside air. The cooling capacity of the DX coil is directly related to the number of system operating compressors and/or the status of the compressor unloaders, as well as the rate of air flow through the coil. However, coil capacity may only be added or removed in relatively large discrete increments or stages. As a result, it is difficult to smoothly adjust the coil capacity as a function of controller output. Because the time constant of a coil is small, typically in the range of 1–3 minutes, and the minimum change in relative coil capacity for stages is large, typically twenty-five (25%) percent of total capacity, large and often rapid fluctuations in supply air temperature result.

The large fluctuations in supply air temperature constitute a significant source of thermodynamic zone disturbance as zone energy advection, defined as the thermal and kinetic energy associated with bulk fluid motion across a control volume surface, or the zone heat transfer rate, is altered. Energy advection can thus adversely impact the zone temperature control accuracy and stability. As zone instability can contribute to excessive mechanical wear on the VAV box components such as the box actuator, linkage and damper, it is desirable to minimize this parameter.

Therefore, there is a need for a method of minimizing zone air disturbance caused by air supplied from the VAV system, while effectively maintaining control of the zone temperature at or near a zone temperature setpoint.

SUMMARY OF THE INVENTION

Accordingly, the present invention provides a control strategy for minimizing supply air temperature disturbances in VAV systems using staged DX cooling. The strategy of the present invention estimates the amount of heat advected, or heat transfer rate, associated with a temperature controlled zone. A closed loop temperature control system continuously adjusts the value of the estimated heat transfer rate to control the air dampers in the VAV box, and thereby the flow of air into the zone, to maintain the zone temperature at or near a zone temperature setpoint.

More particularly, the present invention provides a method and corresponding system that minimizes air flow disturbances in a multi-zone air conditioning system. The method includes the steps of setting an air flow rate for conditioned air supplied to a climate-controlled zone to maintain zone temperature at a zone setpoint; measuring zone setpoint deviation at first and second sampling instants within a sampling period; estimating a zone heat transfer rate at the second sampling instant based on the step of measuring zone setpoint deviation measured at the first and second sampling instants; and, in response, adjusting the air flow rate at the second sampling instant to minimize zone air flow disturbances.

These and other various advantages and features of the present invention will become apparent from the following description and claims, in conjunction with the appended drawings.

DETAILED DESCRIPTION OF THE PREFERRED EMBODIMENTS

Figure 1:
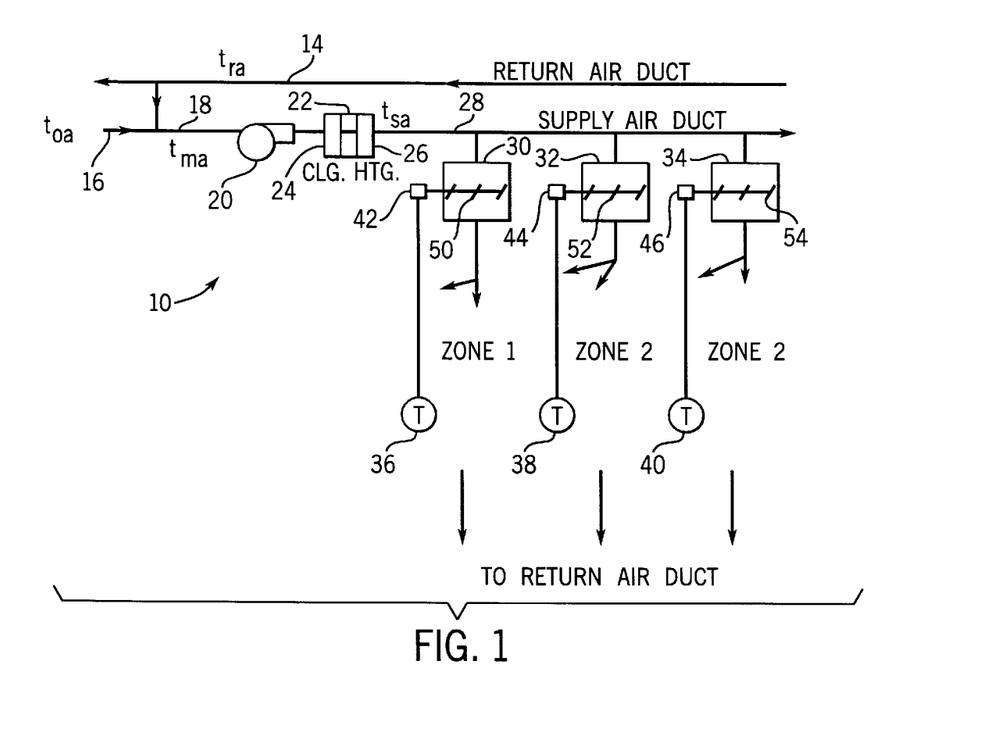
FIG. 1 is a block schematic diagram of a conventional variable air volume air conditioning system incorporating the control strategy of the present invention.

Referring to FIG. 1, a prototypical DX VAV air conditioning system is shown generally at 10. The system 10 includes duct work including a return air duct 14, and an outside air duct 16 in communication with the return air duct. The ducts 14, 16 combine return air, having a temperature $t_{ra}$, with ambient air, having a temperature of $t_{oa}$. The resulting air mixture is output into mixed air duct 18 and has a resultant temperature $t_{ma}$. A fan 20 blows the air mixture into an air conditioning unit 22 having both a cooling element 24 and a heating element 26 for conditioning the mixed air. The cooling unit 24 includes direct expansion (DX) cooling coils that cool and dehumidify the air mixture in response to system cooling parameters. The air conditioning unit 22 outputs conditioned supply air, having a temperature $t_{sa}$, into a supply air duct 28 to cool of one or more system cooling zones, such as zone 1, zone 2 or zone 3, as shown.

Each of the zones includes a VAV box 30, 32, 34 that controls the flow of supply air from the supply air duct 28 into the zones. Each VAV box 30, 32, 34 includes a thermostat 36, 38, 40 in combination with a cascaded VAV controller 42, 44, 46. Each thermostat 36, 38, 40 senses the corresponding zone temperature and generates a temperature signal that is fed back to the respective controller 42, 44, or 46. The controller in turn controls the position of the corresponding VAV box damper 50, 52 or 54. The VAV box damper in turn controls the flow of supply air into the zone, to maintain the corresponding zone temperatures at or near the zone temperature setpoint. The controllers control the zone temperature with minimal fluctuation in zone temperature, which is typically caused by zone disturbances resulting from energy advected into the zone by the air conditioning systems caused by typically large minimum changes in relative coil capacity.

Figure 2:
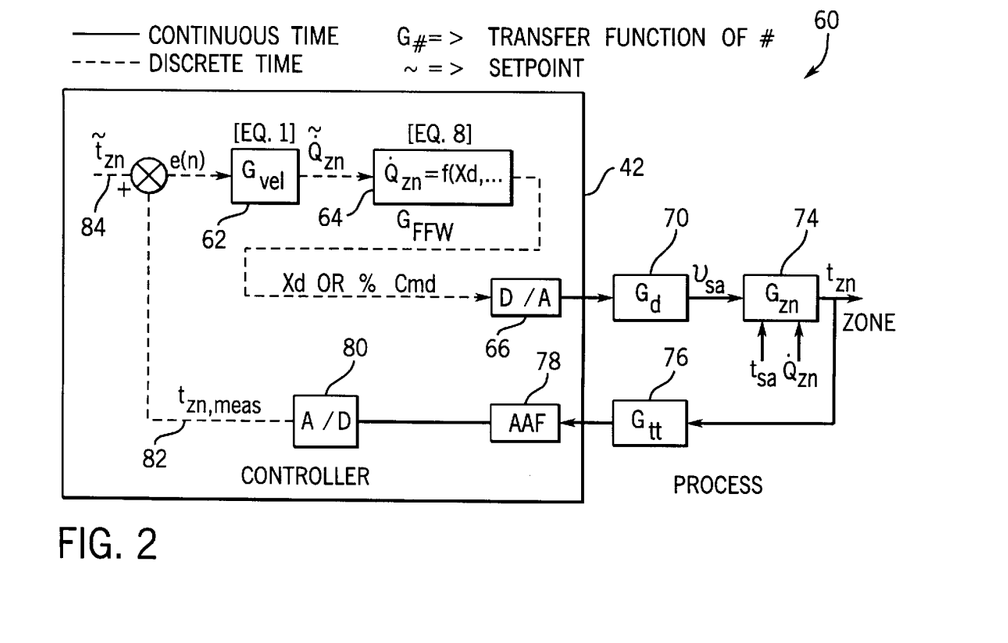
FIG. 2 is a block schematic diagram of the control strategy of the present invention.

Referring to FIG. 2, a detailed schematic system model of the VAV controller-based temperature control strategy associated with each of the zones is shown generally at 60. The control strategy is realized through programming of the controllers 42, 44, 46 via conventional software programming techniques. More particularly, a software block of instructions 62 programmed into each of the controllers, such as the controller 42, computes $\hat{Q}_{zn}$, which is the estimated value of the heat advected into the zone, and which is commonly referred to as the zone heat transfer rate. The estimated value for the zone heat transfer rate is computed through the following equation:

$$\hat{Q}_{zn,n} = K_c \left[ (e_n - e_{n-1}) + \frac{\Delta\Theta}{Y_I} \frac{(e_n + e_{n-1})}{2} \right] + \hat{Q}_{zn,n-1} \quad \text{(Eq. 1)}$$

as constrained by $$\hat{Q}_{zn,n} = \text{MAX}\{\text{MIN}\{\hat{Q}_{zn,n}, \dot{Q}_{MAX}\}, \dot{Q}_{MIN}\} \quad \text{(Eq. 1A)}$$

where $\hat{Q}_{zn,n}$ is an estimate of the heat advected into the zone at the $n^{th}$ sampling instant, $\hat{Q}_{zn,n-1}$ is an estimate of the heat advected into the zone for the n-1 sampling instant, $\dot{Q}_{MAX}$ is the maximum heat gain for the space, $\dot{Q}_{MIN}$ is the minimum heat gain for the space, $K_c$ is the proportional controller gain, $Y_I$ is the controller integral time, $_{\Delta\Theta}$, is the sampling period, and $e_n$ is the error at the $n^{th}$ sampling instant.

In the above zone heat transfer rate, the controller error is defined by:

$$e_n = \tilde{t}_{zn} - t_{zn,meas.} \quad \text{(Eq. 2)}$$

where $\tilde{t}_{zn}$ is the zone temperature setpoint and $t_{zn,meas.}$ is the measured zone temperature.

One advantage of using the velocity form of the PI algorithm is that no initialization of the output $\hat{Q}_{zn}$ is required to initiate the algorithm if it has been stopped. The primary limitation of the velocity algorithm, is that the integral mode must be included. Otherwise the setpoint cancels out in the proportional expression, except momentarily after a change in setpoint. Over time this will cause the process to drift away from setpoint. The values for $\dot{Q}_{MIN}$ and $\dot{Q}_{MAX}$ can be obtained from design drawings, can be easily calculated knowing design flow rates and temperatures, or can be entered as simple heuristics.

The software block 62 outputs the estimated value $\hat{Q}_{zn}$ into a feed-forward control software block 64. The feed-forward control software block 64 generates a signal that is output to the associated zone damper for control of the damper position, and thus the flow of supply air into the particular zone. The feed-forward control software block is realized through a lumped steady state energy balance equation that is combined with a damper map, as represented by Equation 3 below:

$$\dot{\omega}_{sa} = \frac{\dot{Q}_{zn}}{\rho_{air} c_{p,air}(t_{sa} - t_{zn})} \quad \text{(Eq. 3)}$$

where $\dot{\omega}_{sa}$ is the supply air flowrate, $\rho_{air}$ is the density of the zone air, and $c_{p,air}$ is the specific heat of the zone air.

A damper map relates the damper flow rate to the damper position. One example of a mapping function is given by the following equation (Equation 4) which relates flow rate to the fractional damper position $X_d$ as a function of damper authority N and static pressure $P_{static}$. The value of N could specified to be a value between 0 and 1 or it could be enumerated as: Low, Normal, or High for less sophisticated users.

$$\dot{\omega}_{sa} = \left[ \frac{N^{-1}}{N^{-1} - 1 + X_{d,inherent}^{-2}} \right]^{1/2} \cdot C_{VDES} \cdot \sqrt{P_{static}} \quad \text{(Eq. 4)}$$

where:

$$X_{d,inherent} = f(X_d, \text{damper construction})$$

The feed forward control software block 64 outputs the fractional damper position signal $X_d$ from the controller 42 through a digital to analog converter 66. The analog output signal is then used to adjust the position of the VAV box damper, represented by the model $G_d$ at 70. The actual damper position is adjusted according to the position calculated by the feed forward control block 64. The damper $G_d$ 70 subsequently adjusts the supply air flow rate $\dot{\omega}_{sa}$ associated with the temperature controlled zone. The supply air flow rate $\dot{\omega}_{sa}$, along with the supply air temperature $t_{sa}$ and the heat transfer rate $\hat{Q}_{zn}$, combine to dictate the zone temperature $t_{zn}$, as indicated by the mathematical model $G_{zn}$ at 74.

The zone temperature $t_{zn}$ is sensed by the thermostat, or temperature transmitter, represented by the model $G_{tt}$ at 76. The thermostat 76 generates a signal that is input through an anti-aliasing filter AAF at 78 to an analog-to-digital converter 80. The resulting digital signal corresponds to the measured zone temperature $t_{zn,meas}$ at 82. The signal 82 is then multiplexed with a zone temperature setpoint signal $\tilde{t}_{zn}$ 84 set by the controller 42. The multiplexed signals 82, 84 are input into the software block 62, and a new estimate of the heat transfer rate is calculated.

The fractional flow rate of the inherent damper characteristic $X_{d,inherent}$ is typically related to $X_d$ by an empirical relationship with coefficients that are unique to the damper construction and linkage. Second and third order polynomials are commonly used, but other linear or non-linear empirical forms are also appropriate. For notation purposes, $P_n(X_d)$ will denote a polynomial of degree "n" which relates $X_{d,inherent}$ to $X_d$. For a 3rd order polynomial, the mapping given by Equation 4 could be rewritten as shown in Equation 5.

$$\dot{\omega}_{sa} = \left[ \frac{N^{-1}}{N^{-1} - 1 + P_3(X_d)^{-2}} \right]^{1/2} C_{VDES} \cdot \sqrt{P_{static}} \quad \text{(Eq. 5)}$$

The energy balance (Equation 3) and the example damper map (Equation 5, or some other mapping) can then be combined to relate the estimate of $\dot{Q}_{zn}$ to a damper position $X_d$ as shown in Equation 6.

$$\hat{Q}_{zn} = \left[ \frac{N^{-1}}{N^{-1} - 1 + P_3(X_d)^{-2}} \right]^{1/2} C_{VDES} \cdot \sqrt{P_{static}} \, {}^* \rho_{air} {}^* C_{p,air} {}^* (t_{sa} - \tilde{t}_{zn}) \quad \text{(Eq. 6)}$$

The value of $P_{static}$ can be assumed to be a constant predetermined value or it could be updated over a network if the pressure setpoint were changed. Equation 6 could be solved analytically to give $$X_d = f(\hat{Q}_{zn}, Cv_{DES}, N, P_{static}, \tilde{t}_{sa}, t_{zn}, \rho_{air}, C_{p,air}) \quad \text{(Eq. 7)}$$

where $\hat{Q}_{zn}$ is the estimated zone heat transfer rate, N is damper authority, $P_{static}$ is static zone pressure, $T_{sa}$ is the temperature of the supply air, $T_{zn}$ is the sensed zone temperature, $\rho_{air}$ is the density of the zone air, and $C_{p,air}$ is the specific heat of the zone air.

The above result is difficult to implement due to its size and multiple roots. Implicit numerical methods could also be used to effectively solve for $X_d$ because all of the independent variables shown in Equation 7 are either known, can be estimated, or can be assumed constant. A partial list of implicit numerical methods would include: Newton's method, quasi-Newton's method, secant method, direct search methods, Brent's method, and etc.

Figure 3:
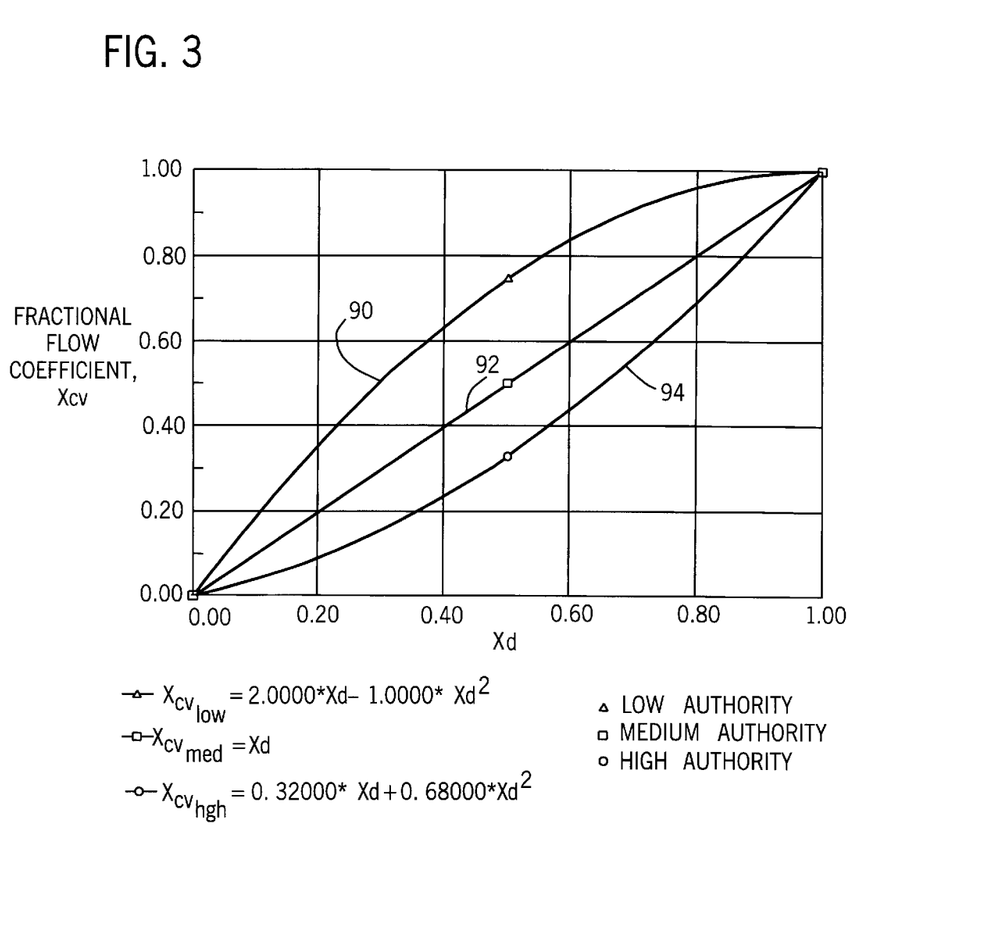
FIG. 3 is a graph of fractional flow coefficient, $x_{cv}$ as a function of fractional damper position $x_d$.

In the preferred approach, which minimizes memory and microprocessor requirements, the fractional flow coefficient as a function of fractional damper position is fitted to either a $1^{st}$ or $2^{nd}$ degree polynomial for 3 enumerated authority values (Low, Medium, High). The resulting curves are shown at 90, 92 and 94, respectively, in FIG. 3. Analytical solutions are given below for each of the three enumerated cases.

Enumeration = Low Authority $$X_d = 1 - \sqrt{1 - \frac{\hat{Q}_{zn}}{(Cv_{DES} \cdot \sqrt{P_{static}} \quad \rho_{air} \cdot c_{p,air} \cdot (t_{sa} - \tilde{t}_{zn}))}} \quad \text{(Eq. 8)}$$

Enumeration = Medium Authority $$X_d = \frac{\hat{Q}_{zn}}{(Cv_{DES} \cdot \sqrt{P_{static}} \quad \cdot \rho_{air} \cdot C_{p,air} \cdot (t_{sa} - \tilde{t}_{zn}))} \quad \text{(Eq. 9)}$$

Enumeration = High Authority $$X_d = -0.2353 + \frac{\sqrt{0.1024 + 2.72 \cdot \frac{\hat{Q}_{zn}}{(Cv_{DES} \cdot \sqrt{P_{static}} \quad \cdot \rho_{air} \cdot C_{p,air} \cdot (t_{sa} - \tilde{t}_{zn}))}}}{1.36} \quad \text{(Eq. 10)}$$

For all enumerations (Eqs. 8–10) the value of $X_d$ is forced to values between 0.0 and 1.0 as shown below.

$$x_d = \text{Max}\{\text{Min}\{X_d, 1.0\}, 0.0\} \quad \text{(Eq. 11)}$$

The percentage output command to the damper is obtained by $$\text{DmprCmd} = X_d \cdot 100\% \quad \text{(Eq. 12)}$$

The above-identified closed-loop zone temperature control strategy therefore minimizes air flow disturbances in the temperature controlled zone. If the value of any independent variable $(t_{sa}, \hat{Q}_{zn}, \tilde{t}_{zn})$ changes, a new damper position is calculated. Thus, disturbances attributed to rapid changes in the value of $t_{sa}$ can be quickly rejected with minimal disruption of the zone thermodynamic balance.

Figure 4:
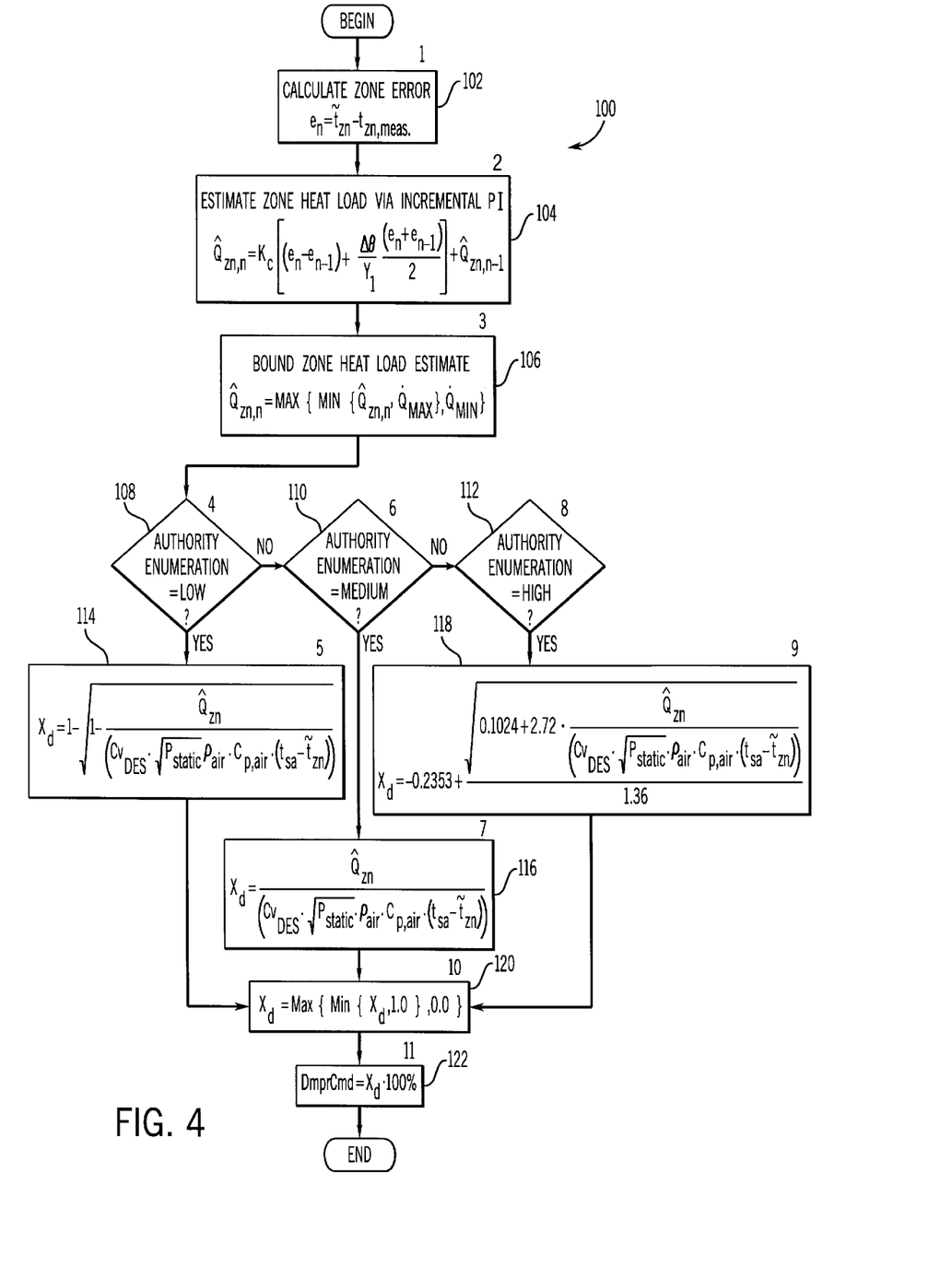
FIG. 4 is a flow diagram illustrating the damper control methodology associated with a preferred embodiment of the present invention.

Referring to FIG. 4, a flow diagram illuminating the methodology associated with the present invention is shown generally at 100. At 102, the VAV controller calculates zone error (Equation 2). At step 104, the controller estimates the zone heat load via an incremental proportional integral (PI) methodology (Equation 1). At step 106, the controller bounds the zone heat load, $\hat{Q}_{zn,n}$ (Equation 1A). After estimating the bound in the zone heat load, the controller determines if the authority enumeration is LOW, MEDIUM or HIGH, as indicated at inquiry steps 108, 110 and 112, respectively. If the controller determines that the authority enumeration is LOW, the damper position $X_d$ is calculated via Equation 8 at step 114. If the controller determines that the authority enumeration is MEDIUM, the damper position $X_d$ is calculated via Equation 9 in step 116. If the controller determines that the authority enumeration is HIGH, the damper position $X_d$ is calculated via Equation 10 at step 118.

It should be appreciated that for all enumerations as calculated at steps 114, 116 and 118, $X_d$ is forced to values between 0.0 and 1.0, as indicated at step 120. The percentage output command to the damper is then calculated as indicated at 122.

It should be appreciated that the control strategy of the present invention must be carefully implemented due to the presence of process interactions. In this case, the manipulated variable of the new cascaded controller affects the controlled variables of other control loops, namely, the static pressure controls and the evaporator capacity controls. This occurs because the cascaded control effectively removes the zone time constant from the system, which normally functionally decouples the faster "Single Input Single Output, SISO" evaporator coil and static pressure control loops.

Figure 5:
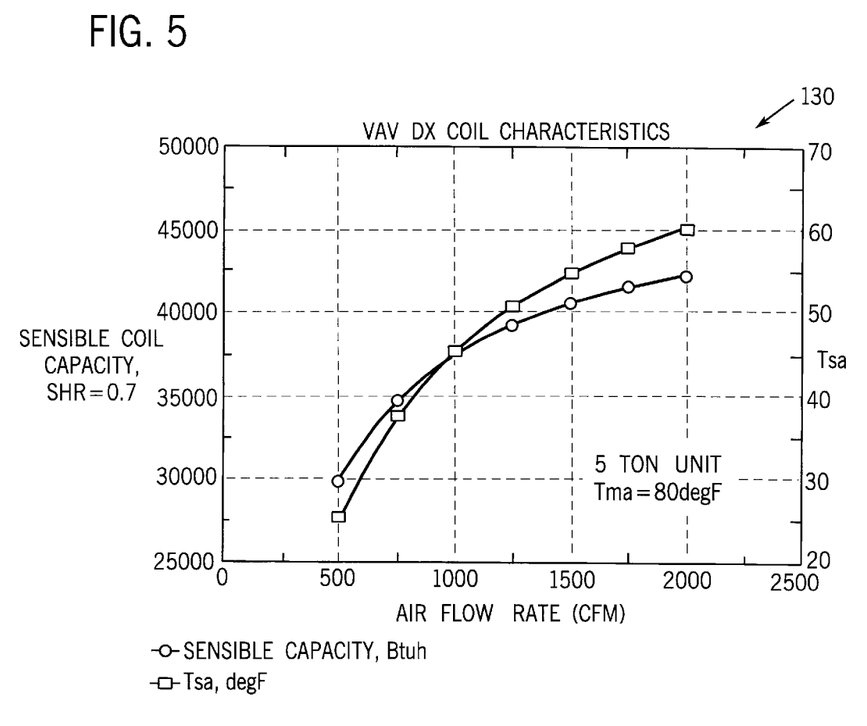
FIG. 5 is a graph of DX coil capacity and supply air temperature, $t_{sa}$ as a function of air flow rate.

Instability attributed to process interactions can be easily illustrated by example. A graph of DX coil capacity and $t_{sa}$ as a function of flow rate is shown at 130 in FIG. 5, with the assumption being made that the zone loads have increased so that an additional evaporator (stage) is added. This will cause the value of $t_{sa}$ to drop by as much as 5°–10° F. The cascaded VAV terminal unit controllers will immediately reject the $t_{sa}$ disturbance by reducing the air flow rate at each zone. This rapid reduction in the system air flow rate will constitute a very large magnitude disturbance for the supply fan duct static pressure controller. Persistent uncontrolled oscillation will result unless the static pressure control loop is well tuned. At the same time the flow rate through the evaporator coil will be reduced which will cause the value of $t_{sa}$ to drop even further.

Without a means to prevent further corrections the cascaded controllers at the VAV boxes will again respond by further reducing the system air flow rate. This cycle can continue until the system capacity and flow rate is inadequate to satisfy the zone thermal requirements and the zone temperatures will deviate from setpoint. The increase in zone temperatures will eventually cause $\dot{Q}_{zn}$ (and consequently $\omega_{sa}$) to increase so that in time the zone temperatures will return to setpoint. Obviously, the dynamics of this process are not desirable.

To prevent these undesirable process dynamics, there are four possible solutions. The simplest would be to limit the number of zones employing the $t_{sa}$ disturbance rejection controller to a relatively small percentage of the total number of zones. Then the capacitance of the other zones would provide enough decoupling to provide stability. However, system implementers often do not have needed expertise to do this properly.

A second option would involve filtering the output of $G_{FFW}$ transfer function block 64 with, for example, a low pass first order filter. The filter weight would be adjusted either by manual or via automatic means to achieve the desired tradeoff between system stability and disturbance rejection.

The third option would involve filtering the $t_{sa}$ measurement. The filter weight would be adjusted until an acceptable compromise between disturbance rejection capabilities and system stability is achieved.

The fourth method for improving system stability is to selectively reject the supply air temperature disturbances. In other words, the source of the $t_{sa}$ disturbance must be identified and only disturbances attributed to changes in the number of operating stages should be rejected. Otherwise the positive feedback scenario previously described can occur.

Figure 6:
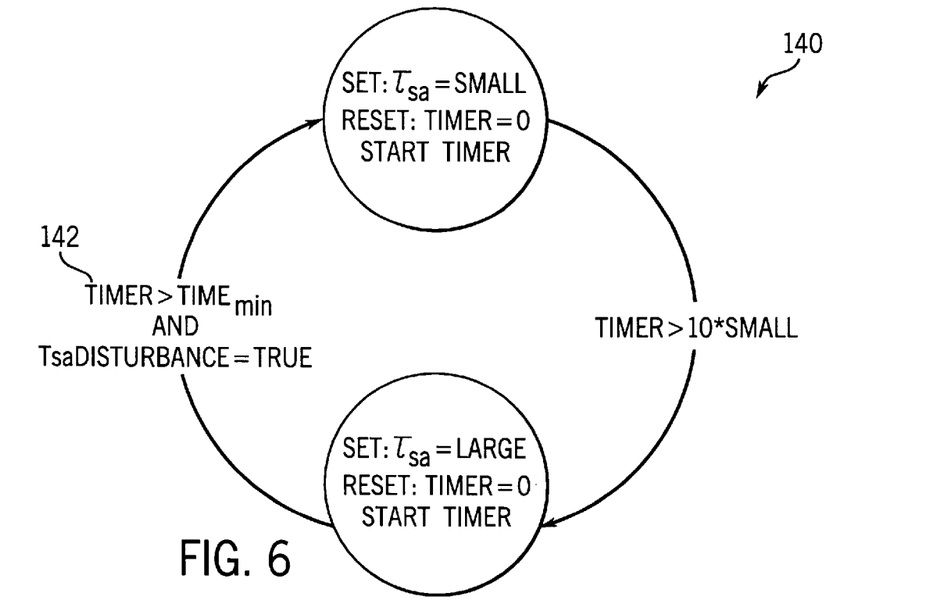
FIG. 6 is a finite state machine for control loop decoupling according to the preferred embodiment of the present invention.

The preferred approach combines the third and fourth options. The finite state diagram shown at 140 in FIG. 6 illustrates the necessary digital logic. In this approach, the value of $t_{sa}$ used in Equations 7 through 10 is filtered by a $1^{st}$ order digital filter with a time constant $Y_{sa}$. The value of $Y_{sa}$ is adjusted in response to a disturbance at 142.

At 142, the Boolean variable TsaDisturbance is set TRUE after a rapid change in the supply air temperature occurs. Either local or network information can be used to determine the value of TsaDisturbance. If a network is present, any change in the number of active stages of capacity could be broadcast to each terminal unit controller. This information could then be used to determine the value of TsaDisturbance as shown at 150 in FIG. 7.

Figure 7:
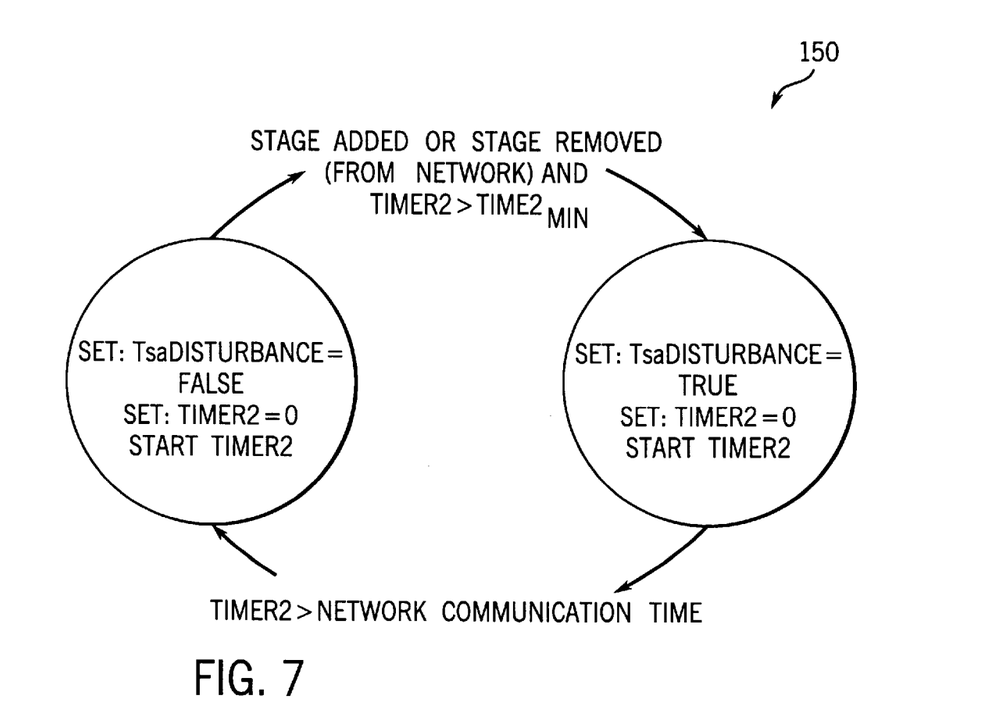
FIG. 7 is a finite state machine of the methodology associated with identifying supply air disturbance via network information.

In FIG. 7, the value of $TIME2_{MIN}$ is a function of the evaporator coil time constant and the duct transport delay. A value of 15 minutes could, for example, be used as a default. Alternatively, if network information is not available, then TsaDisturbance can be identified locally at the VAV terminal units per the finite state drawing shown at 160 in FIG. 8.

Figure 8:
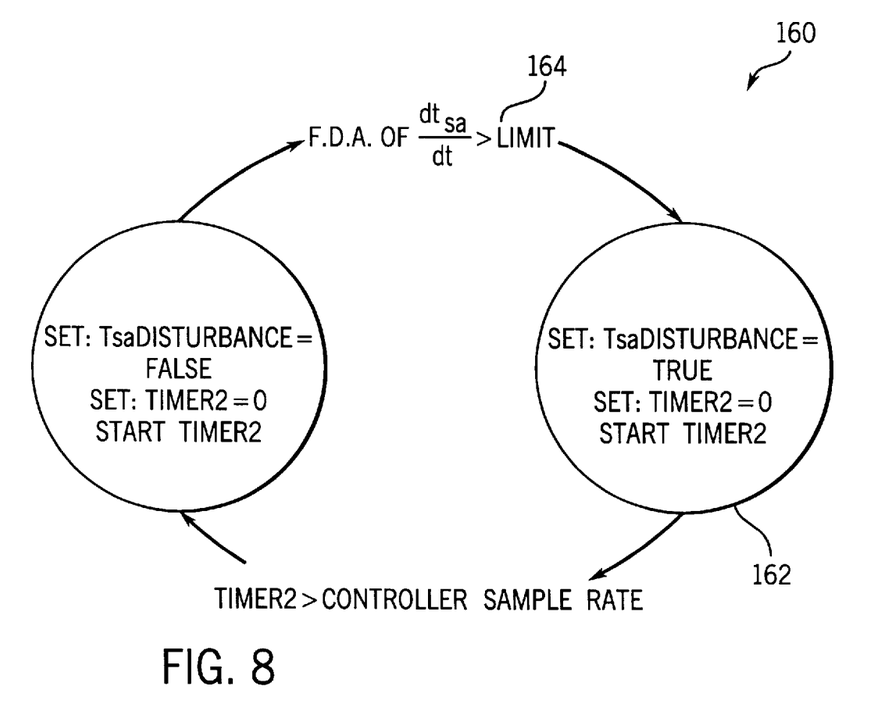
FIG. 8 is a finite state machine of the methodology associated with identifying supply air disturbance inside a VAV terminal unit controller.

The variable TsaDisturbance is set TRUE at 162 if a finite difference approximation (FDA) of the time rate of change of the $t_{sa}$, as measured at the terminal unit, exceeds a predetermined limit at 164. There are numerous methods available for obtaining FDAs for derivatives. For this application, the following FDA is preferred:

$$\dot{t}_{sa} \approx \frac{-3*t_{sa,n-3} -2*t_{sa,n-2} -t_{sa,n-1} +2*t_{sa,n+2} +3*t_{sa,n+3}}{28*T} \quad \text{(Eq. 13)}$$

where $\dot{t}_{sa}$ is an approximation of the derivative of the supply air temperature with respect to time, T is the time interval between each calculation, and the n±1 . . . 3 subscripts are forward or backward sample indexes. Equation 13 is based upon a quadratic fit through seven data points. It inherently provides smoothing which is needed to prevent noise amplification in the FDA. Note that the values of $t_{sa}$ in the above equation have not been filtered. They are the actual temperatures recorded by the supply air temperature sensor located at the terminal unit.

It should be appreciated from the foregoing description that the control strategy of the present invention minimizes air disturbances introduced into a temperature controlled zone by minimizing the associated air conditioning heat transfer rate. When implemented, the control strategy of the present invention thereby minimizes the occurrence of large temperature swings due to cooling or heating of air supplied into the temperature controlled zone through a VAV box, while effectively minimizing mechanical wear on associated VAV box components and minimizing fluctuation in supply air temperature, to maximize the associated comfort level associated with the temperature controlled zone.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

I claim:

1. A method of minimizing air flow disturbances in a multi-zone air conditioning system, comprising the steps of: setting an air flow rate for conditioned air supplied to a climate controlled zone to maintain a zone temperature at a zone setpoint;

measuring deviation from the zone setpoint at first and second sampling instants within a sampling period;

estimating a zone heat transfer rate at the second sampling instant based on the setpoint deviation; and adjusting the air flow rate in response to the step of estimating a zone heat transfer rate to minimize zone air flow disturbances.

2. The method of claim 1, wherein the step of adjusting the zone air flow rate comprises adjusting a zone damper through control of a zone variable to affect the flow rate of the conditioned air into the zone.

3. The method of claim 2, wherein the step of adjusting the zone damper is controlled through the step of calculating a zone damper function by mapping the air flow rate to a zone damper position.

4. The method of claim 3, wherein the step of mapping the air flow rate is controlled through the step of controlling supply air pressure.

5. The method of claim 3, further comprising the step of minimizing system instability due to process interactions by the steps of:

1) selectively controlling the zone damper function in each of a predetermined number of zones;

2) filtering an output of a zone damper control function;

3) filtering a supply air temperature measurement; and 4) rejecting supply air temperature disturbances due to changes in operating system cooling stages.

6. The method of claim 2, wherein a variable used in the step of adjusting the zone damper is selected from the group consisting essentially of: zone heat transfer rate, static zone pressure, supply air temperature, zone setpoint temperature, air velocity, and controller gain.

7. The method of claim 1, wherein the step of measuring deviation from the zone setpoint comprises measuring a difference between the zone temperature setpoint and a measured zone temperature.

8. The method of claim 1, wherein the step of estimating a zone heat transfer rate at the second sampling instant based on the setpoint deviation is dependent on the sampling period and controller integral time.

9. An air conditioning unit, comprising:

an air conditioner;

a regulator coupled to the air conditioner that regulates the amount of conditioned air introduced into a zone;

a controller operatively connected to both the air conditioner and the regulator that is programmed to control operation of the air conditioner and the regulator; and a sensor operatively connected to the regulator and the controller via a closed feedback loop that senses the zone temperature and transmits a sensed zone temperature signal to the controller;

the controller calculating an estimate of a zone heat transfer rate based on the sensed temperature and the zone temperature setpoint, and controlling operation of the regulator based on the estimated zone heat transfer rate to minimize supply air disturbances.

10. The apparatus of claim 9, wherein the regulator comprises a supply air duct that channels air flow from the air conditioner to the zone via a duct outlet; and an adjustable air damper connected to the duct outlet in proximity to the regulated zone that controls the flow of conditioned air into the zone in response to air damper control commands from the controller.

11. The apparatus of claim 10, wherein the controller comprises a feed-forward controller that maps a relationship between the estimated zone heat transfer rate and a position of the adjustable air damper.

12. The apparatus of claim 11, wherein the feed-forward controller lumps a steady state energy balance with a damper map for damper control purposes.

13. The apparatus of claim 12, wherein the damper map relates a damper conditioned air flow rate to damper position.

14. The apparatus of claim 9, wherein the estimated zone heat transfer rate is also a function of proportional controller gain and a previously estimated zone heat transfer rate.

15. The apparatus of claim 14, wherein the estimated zone heat transfer rate is calculated from the following equation:

$$\hat{Q}_{zn,n} = K_c \left[ (e_n - e_{n-1}) + \frac{D_q}{t_I} \frac{(e_n + e_{n-1})}{2} \right] + \hat{Q}_{zn,n-1}$$

where $\hat{Q}_{zn,n}$ is an estimate of the heat advected into the zone at the $n^{th}$ sampling instant, $\hat{Q}_{zn,n-1}$ is an estimate of the heat advected into the zone for the n-1 sampling instant, $K_c$ is the proportional controller gain, $t_I$ is the controller integral time, $D_a$ is the sampling period, $e_n$ is the error at the $n^{th}$ sampling instant, and $e_{n-1}$ is the error at the $(n-1)^{th}$ sampling instant.

\* \* \* \* \*